US006423221B1

(12) United States Patent
Kohlhaas et al.

(10) Patent No.: US 6,423,221 B1
(45) Date of Patent: Jul. 23, 2002

(54) PUMP ASSEMBLY

(75) Inventors: Helmut Kohlhaas, Wildeck-Richelsdorf; Dieter Wilhelm, Neu-Anspach, both of (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/423,256

(22) PCT Filed: Apr. 21, 1998

(86) PCT No.: PCT/EP98/02336

§ 371 (c)(1), (2), (4) Date: Feb. 10, 2000

(87) PCT Pub. No.: WO98/50695

PCT Pub. Date: Nov. 12, 1998

(51) Int. Cl.[7] .......................... B01D 35/26; B01D 35/02

(52) U.S. Cl. .................... 210/232; 210/416.4; 210/460; 123/509; 123/514

(58) Field of Search ................................ 210/172, 232, 210/416.4, 460; 123/509, 514

(56) References Cited

U.S. PATENT DOCUMENTS

| | | | | |
|---|---|---|---|---|
| 2,306,297 | A | * | 12/1942 | Curtis |
| 2,464,196 | A | * | 3/1949 | Van Ranst |
| 2,494,086 | A | * | 1/1950 | Curtis |
| 2,576,894 | A | * | 11/1951 | Van Ranst et al. |
| 2,818,027 | A | * | 12/1957 | Barnes et al. |
| 2,872,871 | A | * | 2/1959 | Allan |
| 2,978,990 | A | * | 4/1961 | Lewis |
| 3,014,623 | A | * | 12/1961 | Horn et al. |
| 3,398,835 | A | * | 8/1968 | Offer |
| 3,530,991 | A | * | 9/1970 | Phillips |
| 3,575,296 | A | * | 4/1971 | Peterson |
| 3,875,059 | A | * | 4/1975 | Maschino |
| 3,950,251 | A | * | 4/1976 | Hiller |
| 4,707,165 | A | * | 11/1987 | Tauber et al. |
| 4,818,398 | A | * | 4/1989 | Lott et al. |
| 5,156,540 | A | * | 10/1992 | Fernau et al. |
| 5,411,376 | A | | 5/1995 | Fournier et al. |
| 5,618,171 | A | * | 4/1997 | Von Behr et al. |

FOREIGN PATENT DOCUMENTS

| | | | |
|---|---|---|---|
| DE | 4119160 | * | 12/1992 |
| DE | 43 38 349 A1 | | 11/1995 |
| DE | 195 13 414 A1 | | 10/1996 |
| GB | 1033241 | | 6/1966 |
| WO | 92/15785 | * | 9/1992 |

* cited by examiner

*Primary Examiner*—Thomas M. Lithgow
(74) *Attorney, Agent, or Firm*—Richard A. Speer; Mayer, Brown, Rowe & Maw

(57) ABSTRACT

A pump assembly is comprised of a pump member having a pump wall and a filter element located within a filter housing that is prestressed against the pump wall. In an exemplary embodiment, a housing of the pump assembly is manufactured in a single piece with a clamping element. The clamping element includes a flanged border for gripping behind an edge of the filter housing.

3 Claims, 1 Drawing Sheet

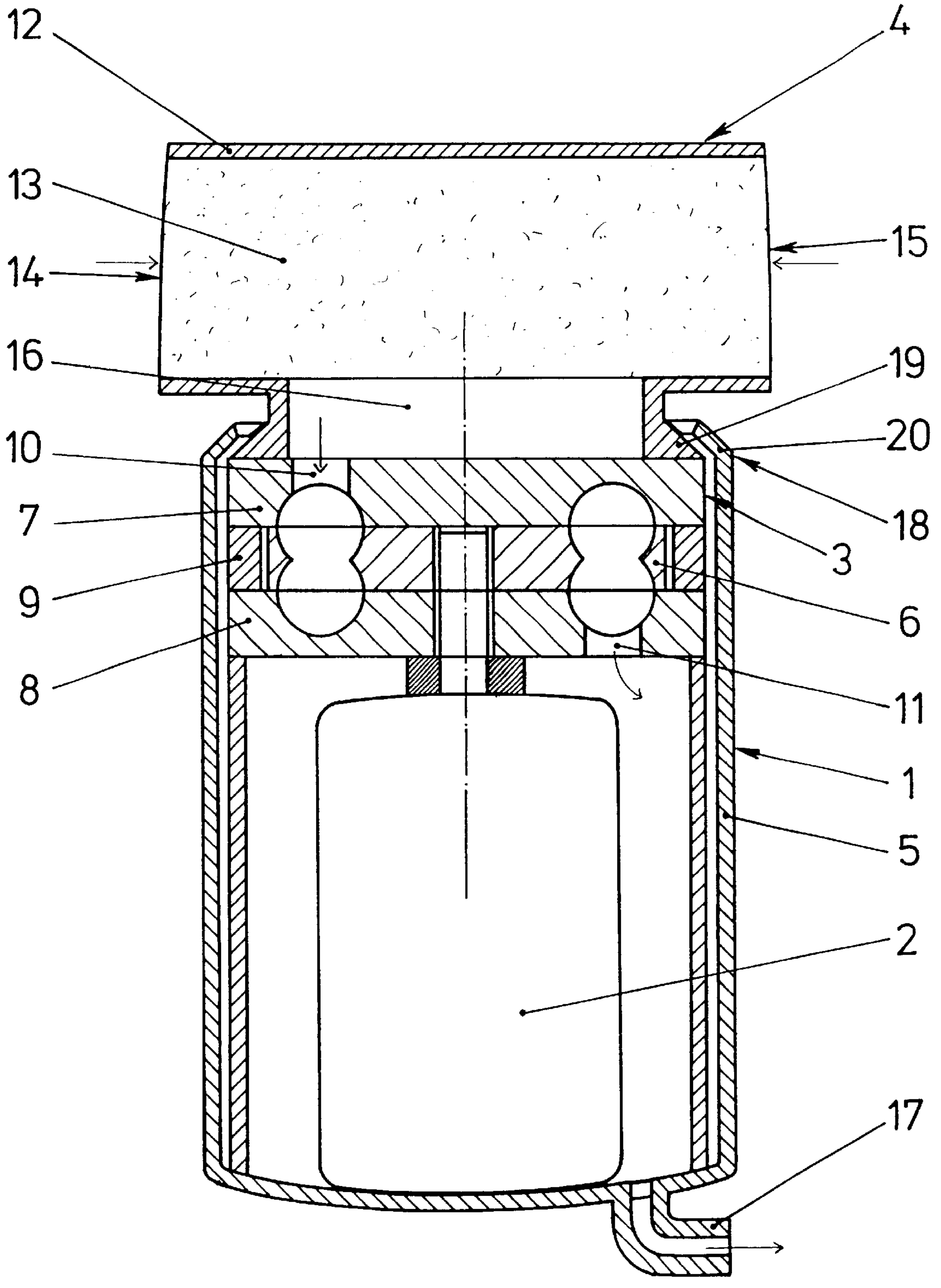
12
4
13
15
14
16
19
20
10
18
7
3
9
6
8
11
1
5
2
17

PUMP ASSEMBLY

BACKGROUND OF THE INVENTION

1. Field of the Invention

The invention relates to a conveying unit having a pump, which has a pump wall, and having a filter element which is to be fastened to the pump wall in the region of an inlet duct.

2. Description of the Related Art

Conveying units of this type are, for example, used to a great extent in today's motor vehicle in a fuel tank for the conveying of fuel, and are therefore known. The conveying unit generally forms a preassemblable unit together with an electric motor provided for driving the pump. In this connection, the inlet duct has a connecting branch which protrudes from the pump wall and onto which a connecting piece of the filter element is plugged (DE 44 31 738 A1). The connecting piece is then secured to the connecting branch by means of a pipe clip.

A disadvantage in the case of the known conveying unit is the fact that the pump wall is a component which can be difficult to manufacture because of the protruding connecting branch. The conveying unit becomes very cost-intensive as a result. Furthermore, because of the connecting branch the filter element is at a very great distance from the pump wall, and the conveying unit is hence a very bulky component.

U.S. Pat. No. 5,411,376 discloses a conveying unit which has a large axial extent and instead of a connecting branch has an inlet covering which is like a connecting branch and in which a filter element is arranged. A covering of this type means that the pump bottom can be designed more simply but because of the additional component the outlay on installation for this conveying unit is increased.

SUMMARY OF THE INVENTION

The invention is based on the problem of designing a conveying unit of the type mentioned at the beginning in such a manner that it can be produced particularly cost-effectively and has the smallest possible dimensions.

According to the invention, this problem is solved by the filter elements being prestressed against the pump wall.

By means of this design, the filter element bears directly against the pump wall which has the inlet duct. A connecting branch for the fastening of the filter element, as in the case of the known conveying unit, is therefore no longer required. As a result, the conveying unit according to the invention manufactured in one piece with a housing of the conveying unit or the pump, and has a flanged border which bears against the edge of the filter element. A flanged border of this type is in any case generally required in order to secure individual components of the pump to one another. The manufacturing costs for the conveying unit according to the invention are thereby kept particularly low. Furthermore, the filter element is thereby fastened particularly reliably to the pump even when the motor vehicle is vibrating strongly.

To further reduce the production costs for the conveying unit according to the invention it helps if the pump wall is produced from ceramic by sintering. Since, because of the invention, the pump wall can be configured such that it is flat, a sinter form which is required for producing the pump wall is constructed in a particularly simple manner and can easily be removed from the mold axially. Furthermore, ceramics used in the sintering technique have a particularly high surface hardness, a hard compressive strength and good corrosion resistance, so that the conveying unit has particularly high durability. Suitable ceramics include, for example, silicon carbide or oxide ceramic. The particularly high durability of the conveying unit according to the invention is, in particular, necessary if the conveying unit is provided for use in a fuel tank which is produced cost-effectively in a blowing process. In this connection, after the blowing procedure, the conveying unit is contained in the fuel tank and can no longer be removed. A further advantage of this design resides in the fact that noises which are produced within the pump by the pump wall, which is manufactured from ceramics, are absorbed particularly well.

BRIEF DESCRIPTION OF THE DRAWINGS

FIG. 1 illustrates a first preferred embodiment of the present invention

DETAILED DESCRIPTION OF THE PRESENTLY PREFERRED EMBODIMENT

The invention permits numerous embodiments. To further clarify its basic principle one of these is represented in the drawing and is described in the following. Said drawing shows, in a single figure, a conveying unit 1 according to the invention having a pump 3, which is driven by an electric motor 2, and a filter element. The electric motor 2 and the pump 3 are arranged in a common, cup-shaped housing 5. The pump 3 is designed as a periphery pump and has an impeller 6 which is driven by the electric motor 2 and rotates between two fixed pump walls 7, 8. The pump walls 7, 8 are retained in their designated position by a tubular spacer 9 which surrounds the impeller 6 concentrically. The spacer 9 has a slightly greater width than the impeller 6. An inlet duct 10 is arranged in the pump wall 7 which faces the filter element 4. An outlet duct 11 is incorporated in the other pump wall 8. The filter element 4 has a filter housing 12 with a filter insert 13 arranged in it. The filter insert 13 may be manufactured, for example, from foam.

When the impeller 6 is rotated, a fluid which is to be conveyed is drawn in through intake openings 14, 15, which are arranged in the filter housing 12, through the filter insert 13 and in the process filtered. The fluid then passes into a collecting space 16 between the filter insert 13 and the pump wall 7 which has the inlet duct 10. The fluid is conveyed from the collecting space 16 by the pump 3 past the electric motor 2 to a tubular connecting branch 17. For clarification purposes, the flow of the fluid is indicated in the drawing by arrows.

At its side which faces the filter element 4, the housing 5 of the conveying unit 1 is manufactured in one piece with a clamping element 18. The clamping element 18 has a flanged border 20 for gripping behind a peripheral edge 19 of the filter housing 12. By this means, the filter housing 12 is prestressed against the pump wall 7, which has the inlet duct 10, and at the same time the individual components of the pump 3 and of the electric motor 2 are secured to one another. For preassembling the conveying unit 1, the electric motor 2, the pump 3 and the filter element 4 can therefore be inserted in a simple manner into the cup-shaped housing 5. After the clamping element 18 is provided with its flanged border, the conveying unit 1 is completely fitted.

What is claimed is:

1. A pump assembly comprising: a pump having a pump wall; and a filter element located within a filter housing wherein the filter housing is prestressed against the pump wall and, wherein the pump assembly further comprises a housing containing the pump and pump wall which has a flanged border acting as a clamping element for prestressing said filter housing to said pump wall.

2. The pump assembly as claimed in claim 1, wherein the clamping element is comprised of a sheet-metal strip which grips an edge of the filter housing and an edge of the pump wall.

3. The pump assembly of claim 1 wherein the pump wall is comprised of a sintered ceramic.

* * * * *